United States Patent
Hansa et al.

(10) Patent No.: US 6,905,718 B2
(45) Date of Patent: *Jun. 14, 2005

(54) OAT AND CORN PRODUCTS CONTAINING ADDED INGREDIENTS AND METHOD

(75) Inventors: James D. Hansa, Algonquin, IL (US); Alice H. Hibbs, Crystal Lake, IL (US); Donald Kent Salisbury, Barrington, IL (US)

(73) Assignee: The Quaker Oats Company, Chicago, IL (US)

( * ) Notice: Subject to any disclaimer, the term of this patent is extended or adjusted under 35 U.S.C. 154(b) by 10 days.

This patent is subject to a terminal disclaimer.

(21) Appl. No.: 09/739,857

(22) Filed: Dec. 18, 2000

(65) Prior Publication Data

US 2002/0076477 A1 Jun. 20, 2002

(51) Int. Cl.[7] ................................ A23L 1/64
(52) U.S. Cl. ................... 426/72; 426/74; 426/506; 426/507; 426/618; 426/639; 426/640
(58) Field of Search ................ 426/72, 618, 506, 426/507, 639, 640, 74

(56) References Cited

U.S. PATENT DOCUMENTS

| | | | |
|---|---|---|---|
| 2,508,477 A | 5/1950 | Stievater, Jr. et al. | |
| 2,829,054 A | * 4/1958 | Feinstone | 99/11 |
| 4,097,613 A | 6/1978 | DeLauder et al. | 426/303 |
| 4,451,488 A | 5/1984 | Cook et al. | 426/89 |
| 4,501,759 A | 2/1985 | Gajewski | 426/96 |
| 4,702,925 A | 10/1987 | Verrico | 426/96 |
| 5,894,027 A | 4/1999 | Kazemzadeh | 426/94 |
| 5,997,917 A | * 12/1999 | Uchida et al. | 426/96 |
| 6,284,299 B1 | * 9/2001 | Morello et al. | 426/455 |

FOREIGN PATENT DOCUMENTS

| | | |
|---|---|---|
| DE | 10 12 157 B | 7/1957 |
| DE | 30 03 158 A1 | 8/1981 |

OTHER PUBLICATIONS

Webster's Ninth New Collegiate Dictionary, merriam webster Inc., Springfied, MA, 1986, p. 1213.*

* cited by examiner

Primary Examiner—Helen Pratt
(74) Attorney, Agent, or Firm—Lars S. Johnson; James D. Ryndak

(57) ABSTRACT

An uncooked oat groat or corn endosperm product comprising added ingredients is provided, wherein the selected ingredients are incorporated inside or adsorbed on the oat groats or corn endosperm and are resistant to chipping or flaking off. Methods are provided for making the foregoing products.

The methods may be used with cut or whole oats and involve adding the selected ingredients in an aqueous medium to the oat groats to increase the moisture content of the groats and to allow the selected ingredients to become adsorbed onto or absorbed within the oat groats.

The methods described above may be used to treat uncooked corn endosperm as a means of adding ingredients either within the corn endosperm or onto the surface of the corn endosperm.

38 Claims, 1 Drawing Sheet

TEMPERING TECHNOLOGY TO ADD INGREDIENTS TO OAT PRODUCTS

OAT AND CORN PRODUCTS CONTAINING ADDED INGREDIENTS AND METHOD

FIELD OF THE INVENTION

This invention relates to an uncooked oat product having added ingredients that do not chip or fall off and methods of making such oat products. More particularly, the present invention relates to (1) an uncooked oat product comprising oat groats that have ingredients incorporated within the groats; and (2) an uncooked oat product comprising oat groats that have ingredients at least partially adsorbed on the groats.

The invention also relates to an uncooked corn product, wherein the endosperm (also called "grit") component of the corn kernel, and not the entire kernel, comprises added ingredients that do not chip or fall off and methods of making such corn products. More particularly, in accordance with the invention, the inventive corn product comprises added ingredients that are either (1) incorporated within the corn endosperm or (2) adsorbed onto the corn endosperm surface.

This invention also relates, in particular, to methods of (a) incorporating ingredients into uncooked oat groats and (b) adsorbing ingredients at least partially onto the surface of uncooked oat groats.

BACKGROUND OF THE INVENTION

Compared with other grains, oats offer a high concentration of protein, a good distribution of amino acids, and fiber. Oat groats—the component of oats without the hull that is used to form oat flakes—are reported to have a high protein concentration in the range of about 13.8% to 25.5% by weight. See, Oat, Ch. 10 by V. L. Young and R. A. Forsberg, in "Nutritional Quality of Cereal Grains: Genetic and Agronomic Improvement," pp. 466–475, published by the American Society of Agronomy, Inc., Madison, Wis. (1987). Moreover, the amino acid composition of oat protein is good compared to other grains. Although lysine is the major limiting amino acid in oats, oats still have a higher concentration of this amino acid than is typically found in other grains. Further, rolled oat groats are a good fiber source as they contain about 1.1% crude fiber and thus provide about 0.3 grams of crude fiber per ounce of rolled oat groats.

Whole groats that have been rolled or flaked are called "old fashioned" and generally have a thickness in the range of about 0.015 to 0.035 inches. Groats that have been cut and rolled are called "quick" or "instant" and typically have a thickness in the range of about 0.010 to 0.020 inches. Certain non-groat ingredients in particulate form, such as sweetener or flavors, have been mixed with either of these forms of flaked groats. Typically, however, such products are not suitable for bulk packaging because the mixed ingredients or materials tend to separate from the groats or oat flakes. As a result, such products can be only effectively packaged in small quantities, such as individually sized portions, for example.

Similar problems of ingredient separation are encountered in uncooked corn endosperm products.

Thus, there exists a need for an uncooked oat groat product that contains no added fat and has ingredients incorporated into the oat groats or at least partially adsorbed onto the surface of the oat groats. There also exists a need for economical methods for making the aforedescribed, inventive oat groat products, including methods that obviate the need for a drying step. There also exists a need for uncooked corn endosperm products having ingredients incorporated either into the corn endosperm or at least partially adsorbed onto the surface of the corn endosperm and for methods of making such corn endosperm products.

SUMMARY OF THE INVENTION

Accordingly, one aspect of the present invention is an uncooked oat product that has no added fat and comprises uncooked oat groats having one or more added ingredients or materials infused or absorbed within the oat groats and/or adsorbed to the oat groat surface. The ingredients comprise at least one material selected from the group consisting of nutrients, spices, and flavors. Typically, on a dry weight basis, the materials have a relatively low concentration, in the range of from just slightly greater than about 0% (zero); e.g., about 0.0001%, to about 2% of the oat groat.

In accordance with the present invention, processes are provided for adding ingredients to the grain by either infusing the ingredients into the internal structure of the grain or adsorbing ingredients onto the surface of the grain.

Another aspect of the present invention is an uncooked oat product that has no added fat and comprises uncooked oat groats having ingredients or materials adsorbed, or at least partially adsorbed on the surface of the oat groat. In such product, on a dry weight basis, the added materials account for up to 1% by weight of the uncooked oat groat.

Still another aspect of the present invention is a method for infusing or incorporating desired ingredients inside the oat groats. The method involves contacting uncooked oat groats with an aqueous solution containing the dissolved ingredient or material for a sufficient amount of time to allow the ingredient or material to become absorbed by and permeate the uncooked oat groat.

Also in accordance with the present invention is a method of adding ingredients or materials to uncooked oat groats so the materials become adsorbed on at least a portion of the surface of the oat groats. This method involves essentially the same steps as the aforedescribed method. However, in this method, the material may be water insoluble and is therefore substantially adsorbed on the surface rather than being absorbed within the oat groat.

Both methods can be used to efficiently, inexpensively and uniformly add desired one or more ingredients to either cut or whole uncooked oat groats in which the resulting product is suitable for bulk packaging since the added ingredients do not separate, flake off or otherwise settle out. As used herein, the term "ingredient" means a substance other than water.

Thus, the present invention—i.e., (1) the oat groat product having added ingredients or materials incorporated therein, (2) the oat groat product having added ingredients or materials adsorbed onto at least a portion of the surface of the oat groat, and (3) the methods for making such products—addresses the need for an oat groat product that utilizes the high protein content of oats, contains no added fat (if desired), and provides consistent product quality because the added ingredients or materials do not easily chip or fall off the oat product. The invention also addresses the need for inexpensive methods for making such products, which can be subsequently flaked if desired, to form an uncooked flaked oat product having a desired ingredient or ingredients absorbed therein or adsorbed thereon. The invention permits the addition of added ingredients to groats that have been previously dried without the necessity of a subsequent drying step after addition of the ingredients.

Also in accordance with the invention is an uncooked corn endosperm product that contains no added fat and has ingredients incorporated into the corn endosperm or at least partially adsorbed onto the surface of the corn endosperm. The invention also includes an inexpensive method of making such products.

Other advantages and features of the invention will become apparent from the following description and from reference to the drawings.

DETAILED DESCRIPTION OF THE INVENTION

Figure 1:
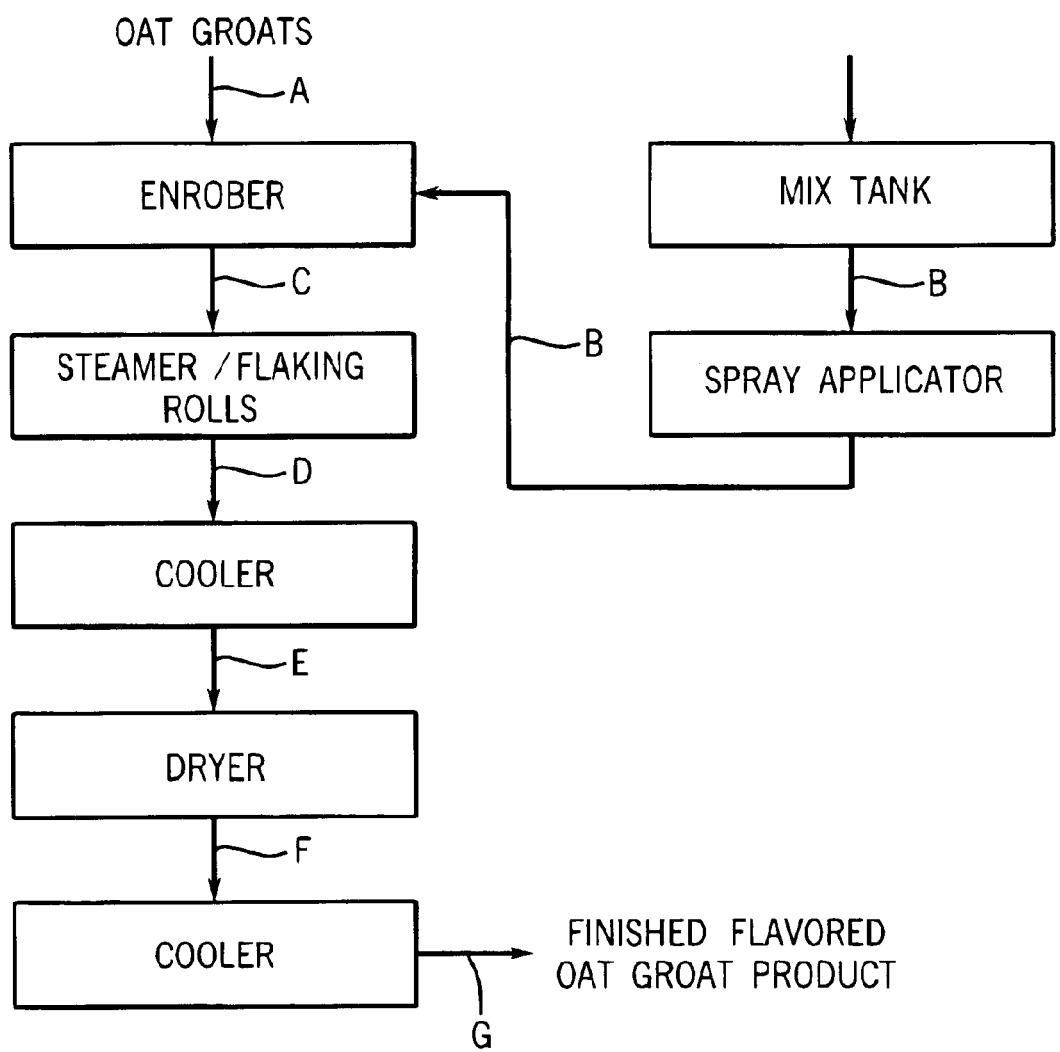
FIG. 1 is a flow chart illustrating a method for incorporating ingredients into uncooked oat groats in accordance with the invention.

This invention includes all alternatives, modifications, and equivalents that may be encompassed within the spirit and scope of the invention, as defined by the appended claims. The invention is not limited to the embodiments described herein.

In accordance with the invention, any source of oat groats can be used and any suitable process can be used to produce oat groats. Oat groats can be obtained from oats in any manner known to those skilled in the art and in any desired size range. Moreover, the invention encompasses all forms of uncooked oat groats—i.e., whole groats and groats that have been cut. Throughout the following description, like numerals and letters refer to like parts or steps.

In accordance with one aspect of the present invention, an oat product is provided which comprises uncooked oat groats that have ingredients incorporated or infused therein, such as by absorption. For purposes of this disclosure, "uncooked" as applied to oats and corn means less than 10% gelatinized starch in the endosperm of that grain. Also in accordance with the present invention is an oat product comprising uncooked oat groats that have ingredients adsorbed, or at least partially adsorbed, on the surface of the oat groats. Both embodiments of the inventive oat product advantageously minimize the possibility of the added ingredients chipping or breaking off the finished product.

The ingredients added to make either inventive oat product typically comprise at least one material selected from the group consisting of nutrients, flavors, and spices. When an ingredient is incorporated into the oat groat product, it is present at a concentration ranging from about slightly more than zero (0)% to about 2% by weight. The preferred amount will depend on the type of ingredient and the effect that is desired. When an ingredient is adsorbed onto the surface of the oat groat, it typically is present at a concentration of from about slightly more than zero (0)% to about 2% by weight of the oat groats on a dry weight basis. For absorption, a water soluble or dispersible ingredient (e.g., a nutrient, flavor or spice) will be utilized. For adsorption, the ingredients can be either water soluble or insoluble; although if the ingredient is water soluble, absorption will also typically occur.

The nutrients used in accordance with the invention typically comprise at least one material selected from the group consisting of vitamins, minerals, natural nutrients, and mixtures thereof. Examples of vitamins include vitamin A, beta-carotene, thiamin, riboflavin, niacin, vitamin $B_6$, vitamin $B_{12}$, vitamin C, vitamin D, vitamin E, folic acid, and derivatives and mixtures thereof. Examples of minerals include calcium, copper, iron, magnesium, manganese, molybdenum, phosphorus, potassium, selenium, zinc, and derivatives and mixtures thereof. Examples of natural nutrients include Echinacea extract, gingko, ginseng, lecithin, bee pollen, St. John's wort extract, and mixtures thereof. Other materials may also be utilized. As used herein, "derivative" means a compound or material that contains or is derived from or a modified form of, the indicated material.

Also in accordance with another aspect of the invention, methods are provided for adding ingredients or materials to uncooked oat groats. Though preferably used with cut oat groats, the methods are also suited for use with whole oat groats. Typically, the methods are employed prior to steaming and/or flaking in order to condition the oat groats and add the desired ingredients. Both methods involve adding water to the oat groats, which preferably are first dried to a specified moisture content of about 6 to 9% or less, to increase their moisture content by about 1.5% or more on a dry weight basis or to achieve a water content of about 8 to 10% or more. If the groats are dried to less than 6%, moisture needs to be added back to the groats within a short period of time to preserve stability and prevent the acceleration of oxidative rancidity. The grain is then held under predetermined conditions to allow the selected ingredients, usually mixed with the water, to become adsorbed onto or absorbed within the oat groat. The selected ingredients are either dissolved or dispersed in the water, depending on their solubility, and the water acts as a vehicle for facilitating the adsorption and/or absorption of the ingredient onto the groat surface or into the groat, respectively. Both methods thus offer the advantage of causing the ingredients to be in intimate contact with the oat groat interior and/or surface so that even after the groat has been further processed, such as by flaking, the ingredient remains in intimate contact with the groat and is thus resistant to becoming separated from the groat. While not wishing to be bound by theory, it is believed that ingredients become absorbed by and intimately associated with the groats in part by capillary action.

Alternatively, for either adsorption or absorption, more water can be added, for example, up to about 20 or 25% or more to achieve a groat water content of about 30 or 35% or more, and the groats can be held for a longer time to allow the water to equilibrate therein followed by drying to a desired moisture content. The additional water will result in a higher concentration of added ingredients in the final groat product.

One method in accordance with the invention absorbs the selected ingredients or materials inside the oat groat; another method causes the ingredients or materials to be adsorbed, or at least partially adsorbed, and bound onto the surface of the oat groat. The ingredients identified above may be used with both inventive methods—i.e., nutrients, spices, and flavors. Absorption or adsorption depends on the solubility in water of the selected ingredient.

The method for incorporating one or more ingredients inside the oat groats (i.e. by absorption) comprises: (1) contacting uncooked oat groats, which may be supplied as a continuous feed stream of groats, with an aqueous infusion solution or medium, containing the ingredient(s), in an amount effective to cause ingredient absorption by the oat groats and to increase the final moisture content of the oat groats by from about 8% to about 10% or more. Thereafter, optionally and preferably, (2) equilibrating the oat groats for a sufficient amount of time to allow the aqueous infusion solution to continue to contact the oat groats and to allow further ingredient absorption to a desired uniform degree, so as to form equilibrated oat groats having the ingredient(s)

absorbed therein to a desired degree. Thereafter, optionally (3) drying the (equilibrated) oat groats to a desired moisture content to form dried oat groats with the absorbed ingredients at a desired moisture content. Equilibration helps to ensure that the absorption has reached an equilibrium and a uniform amount of absorbed ingredient(s). Thereafter, the groats can be flaked by known methods, if desired, to form a flaked oat product with the ingredient(s) absorbed or contained therein.

The methods of the invention can be used in either a batch or continuous process. In a continuous process, a feed stream is provided that normally consists of uncooked oat groats that preferably have been dried to a moisture concentration of about 7% to about 8% on a dry weight basis. Prior to drying, oat groats generally have a moisture concentration in the range of from about 11% to about 13% or more on a dry weight basis. The aqueous solution, which contains one or more of the selected ingredients or materials, is generally applied to the uncooked, unflaked oat groats, which preferably are first dried, at a concentration sufficient to result in the desired concentration of added ingredient in the resulting oat groat product. The treated oat groats can be allowed to equilibrate for a sufficient time under conditions that effectively allow the aqueous solution to further permeate the internal structure of the oat groat and form the ingredient-containing groat product.

In one embodiment of the invention, the infusion solution is prepared by mixing water with at least one material selected from the group consisting of nutrients, spices, and flavor. Prior to its application to the oat groats, the infusion solution is heated, such as up to about 120° F., to facilitate dissolution and/or dispersion of the ingredients and absorption by the groats.

After equilibration, the infused oat groat product typically has a moisture concentration of from about 8% to about 10% or more. The added ingredient(s) typically account for up to about 2% on a dry weight basis of the infused oat groat product.

In accordance with another method of the invention, one or more ingredients are applied so that they become adsorbed or bound to the surface of the oat groat or onto at least a portion of the groat surface. This method, which can be batch or continuous, is typically used with ingredients or materials that are dispersible, but not dissolvable, in water. The method can comprise (1) contacting the surface of uncooked oat groats (which may be supplied batchwise or as a continuous stream of groats) with an aqueous medium, dispersion or mixture, containing the selected material or ingredient for a time and in an amount effective to contact the oat groats and increase the final moisture content of the oat groats by from about 8% to about 10% and to allow and cause ingredient adsorption to the desired degree; and (2) preferably (optionally) equilibrating the coated oat groats for a sufficient amount of time to allow the aqueous medium, dispersion or mixture to become bound or adsorbed onto at least a portion of the surface of the oat groats to a desired uniform degree or amount. Typically, the infusion mixture is applied to the surface of the oat groats at a concentration of from about 2% to about 29% by weight of the oat groats. Thereafter, optionally (3) drying the (equilibrated) oat groats to a desired moisture concentration to form the ingredient-containing groat. Equilibration helps to ensure that the ingredient adsorption has reached equilibrium and that a uniform amount of ingredient(s) has been adsorbed. Thereafter, the groats can be flaked by known methods, if desired, to form a flaked oat product with the added ingredient(s) adsorbed thereon.

The adsorption method can also be used with uncooked oat groats that have been dried, such as to a moisture content of about 7% to about 8% or less, on a dry weight basis. The application step can, for example, deposit the aqueous mixture onto the oat groat in a concentration of from slightly more than about 0% to about 2% by weight of the coated oat groats. Equilibration can continue for a sufficient time and under conditions that permit the aqueous mixture to become further adsorbed or bound onto the oat groat surface or to permeate the oat groat just beneath its surface. Prior to drying, the equilibrated oat groat product typically has a moisture concentration of up to about 35% or more. The added ingredients account for up to about 2% on a dry weight basis of the infused oat groat product.

The adsorption and absorption methods are not restricted to any particular equipment. The infusion, equilibrating, and drying steps can be performed by any suitable manner known to those skilled in the art. For example, the infusion or applying step can be achieved by any suitable equipment known in the art, such as a screw conveyor system or a rotating drum and a spray applicator, for example. Drying can be achieved by any suitable equipment, such as a kiln-type grain dryer (for oats), a continuous belt dryer or a fluidized bed, forced air dryer, for example. Moisture equilibration can be performed by any suitable means known to those skilled in the art, such as by holding in a storage bin. Because these devices are well known to those skilled in the art, a detailed disclosure of such equipment is not provided here.

The methods of the present invention can be performed during the well-known conventional tempering of oats or corn, in preparation for further processing, such as flaking.

Generally, the drying step in both methods will typically be done at a temperature in the range of from about 150° F. to about 300° F. to reduce the moisture content of the oat groat product to about 8–10%, on a dry weight basis. Preferably, the finished oat groat product has a moisture content of about 8–10%, on a dry weight basis.

EXAMPLE

The following illustrates a method of incorporating a water-soluble butter flavor into uncooked oat groats that have been cut. As shown in FIG. 1, the process commences with feeding into a rotating drum a continuous stream A of dried, uncooked oat groats, having a moisture content of about 10.6% on a dry weight basis. The dried oat groats are fed at a rate of about 615 lbs/hr. The oat groats are coated with an infusion solution stream B comprising about 81.6% water, 12.3% salt, and about 6.1% butter flavor until the coated oat groats C have a moisture content of about 16.2% on a dry weight basis. In this example, infusion solution B is applied at a rate of 72 lbs/hr with a spray applicator having three SU 16 nozzles, an air pressure of 17 psi and a pump pressure of 40 psi.

The coated oat groats stream C are tempered or conditioned—meaning that moisture equilibrates through the cut groats—before they are steamed and flaked. Because cut groats are thinner than whole groats, they absorb water more quickly and require less time for moisture to equilibrate. The tempered oat groats are flaked to a thickness of about 0.018 inches. The oat flakes stream D are subsequently cooled for about two minutes and fed via stream E for drying in a conveyor oven for four minutes at 200° F. at a depth of from one to three inches. The flaked, oat groats stream F are cooled a second time for three minutes, yielding a finished butter-flavored oat groat product stream G having a moisture concentration of about 10.6%.

Alternatively, the foregoing process could be operated so that the moisture content resulting from infusion is in the range of about 8 to 10% on a dry weight basis to avoid the subsequent drying step.

Also, in accordance with the invention, both the adsorption and absorption methods described above can be used to treat uncooked corn endosperm so as to add ingredients either within the corn endosperm or onto the surface of the corn endosperm.

While the invention has been described with respect to certain preferred embodiments, it is to be understood that the invention is capable of numerous changes, modifications and rearrangements without departing from the scope or spirit of the invention as defined in the claims.

We claim:

1. An uncooked food product consisting essentially of a food selected from the group consisting of uncooked flaked whole oat groats, uncooked corn grit and mixtures thereof, and added material absorbed into the food, said material being water soluble or water dispersible and selected from the group consisting of vitamins, minerals, nutrients selected from Echinacea extract, gingko, ginseng, bee pollen, lecithin, St. John's wort extract and mixtures thereof, spices, flavors and combinations thereof present in an amount of from about 0.0001% to about 2.0% on a dry weight basis of the food product.

2. The product of claim 1 wherein said vitamins are selected from the group consisting of vitamin A, beta-carotene, thiamin, riboflavin, niacin, vitamin $B_6$, vitamin $B_{12}$, vitamin C, vitamin D, vitamin E, folic acid, and derivatives and mixtures thereof.

3. The product of claim 1 wherein said minerals are selected from the group consisting of derivatives of calcium, copper, iron, magnesium, manganese, molybdenum, phosphorus, potassium, selenium, zinc, and derivatives and mixtures thereof.

4. The product of claim 1 wherein said product has a moisture content of about 8% to about 10%.

5. The product of claim 1 wherein said added material is substantially fat-free.

6. The product of claim 1 wherein said material is substantially fat-free.

7. A method of incorporating at least one water soluble or water dispersible ingredient into the body of food selected from the group consisting of uncooked oat groats and uncooked corn grit, comprising:
   (a) tempering the food;
   (b) contacting the food with an aqueous infusion mixture of water and the ingredient for a time and in an amount and ingredient concentration effective to increase the moisture content of the food by from about 1% to about 35% by weight of the food and to absorb the ingredient;
   (c) optionally equilibrating the contacted food with the aqueous infusion mixture for a sufficient amount of time to cause further absorption of the ingredient by the food, and
   (d) flaking the groats after absorption of the ingredient.

8. The method of claim 7 further comprising drying the oat groats to a desired moisture concentration after absorption of the ingredient.

9. The method of claim 7 further comprising heating the aqueous solution to about 120° F. to dissolve the materials of said solution prior to the applying step.

10. The method of claim 7 wherein said selected materials are applied to the oat groats at a concentration of from about 0.0001% to about 2.0% on a dry weight basis of the food.

11. The method of claim 7 wherein said oat groats are dried to a moisture concentration of about 8% to about 10% on a dry weight basis.

12. The method of claim 7 wherein said drying step is accomplished at a temperature of from about 150° F. to about 300° F.

13. The method of claim 7 wherein said drying step is accomplished by a dryer selected from the group consisting of a continuous belt dryer; a fluidized bed, forced air dryer; or a kiln-type grain dryer.

14. The method of claim 7 wherein said food is uncooked oat groats and said aqueous infusion mixture is applied to the surface of the uncooked oat groats in an amount of from about 2% to about 29% by total weight of the oat groats.

15. The method of claim 7 wherein said equilibrating step is conducted by holding in a storage bin.

16. The method of claim 7 further comprising drying the uncooked oat groats to a desired moisture concentration prior to step (a).

17. The method of claim 7 wherein the infusion mixture is a solution.

18. The method of claim 7 wherein the infusion mixture is a dispersion.

19. The method of claim 7 wherein said vitamins are selected from the group consisting of derivatives of vitamin A, beta-carotene, thiamin, riboflavin, niacin, vitamin $B_6$, vitamin $B_{12}$, vitamin C, vitamin D, vitamin E, folic acid, and mixtures thereof.

20. The method of claim 7 wherein said minerals are selected from the group consisting of derivatives of calcium, copper, iron, magnesium, manganese, molybdenum, phosphorus, potassium, selenium, zinc, and derivatives and mixtures thereof.

21. The method of claim 7 wherein said contacting and said tempering occur simultaneously.

22. The method of claim 7 wherein said contacting and optional equilibrating occurs prior to said flaking.

23. The method of claim 7 wherein said contacting occurs prior to said tempering.

24. The method of claim 7 wherein said contacting and said tempering occur simultaneously.

25. The method of claim 7 wherein said contacting occurs prior to said tempering.

26. A method of adding at least one non-water soluble selected ingredient to uncooked oat groats so such ingredient becomes adsorbed onto at least a portion of the surface of the uncooked oat groats, the method comprising:
   (a) tempering the oat groats;
   (b) contacting the surface of the oat groats with an aqueous mixture containing the non-water soluble selected ingredient for a time and in an amount and ingredient concentration effective to increase the moisture content of the uncooked oat groats by from about 1% to about 35% and to cause adsorption of the ingredient;
   (c) optionally equilibrating the coated oat groats with the aqueous mixture for a sufficient amount of time to cause further adsorption of the ingredient onto at least a portion of the surface of the oat groats; and
   (d) flaking the oat groat product after step (b).

27. The method of claim 26 further comprising drying the oat groats to a desired moisture concentration after step (b) of claim 35 to provide a dried uncooked oat groat product having the non-water soluble ingredient adsorbed onto at least a portion of the surface thereof.

28. The method of claim 26 wherein the selected ingredients applied to the oat groats have a concentration of from about 0.0001% to about 2.0% on a dry weight basis of the oat groats.

29. The method of claim 26 wherein said drying step is accomplished at a temperature of from about 150° F. to about 300° F.

30. The method of claim 26 wherein said oat groats are dried to a moisture concentration of about 8% to about 10% on a dry weight basis.

31. The method of claim 26 wherein said equilibrating step is conducted by holding in a storage bin.

32. The method of claim 26 wherein said drying step is accomplished by a dryer selected from the group consisting of a continuous belt dryer; a fluidized bed, forced air dryer; and a kiln-type grain dryer.

33. The method of claim 26 wherein the aqueous mixture is applied to said oat groats at a concentration of from about 2% to about 29% by weight of the oat groats.

34. The method of claim 26 further comprising drying the uncooked oat groats to a desired moisture concentration prior to step (a).

35. The method of claim 26 wherein said contacting and optional equilibrating occurs prior to said flaking.

36. The method of claim 26 wherein said non-water soluble ingredient is selected from the group consisting of vitamins, minerals, natural nutrients, and mixtures thereof.

37. The method of claim 26 wherein said contacting and said tempering occur simultaneously.

38. The method of claim 26 wherein said contacting occurs prior to said tempering.

* * * * *